United States Patent [19]

Pileggi et al.

[11] Patent Number: 5,373,792
[45] Date of Patent: Dec. 20, 1994

[54] RAILWAY GONDOLA CAR INCORPORATING FLEXIBLE PANELS OF COMPOSITE SHEET MATERIAL

[75] Inventors: James D. Pileggi, Beaverton; Ernest G. Wolff, Corvallis, both of Oreg.

[73] Assignees: Gunderson, Inc., Portland; The State of Oregon, Eugene, both of Oreg.

[21] Appl. No.: 60,128

[22] Filed: May 10, 1993

[51] Int. Cl.$^5$ .............................................. B61D 17/00
[52] U.S. Cl. .................................. 105/406.1; 105/422
[58] Field of Search ............... 105/422, 355, 377, 375, 105/404, 406.1, 244, 245, 246; 296/25, 182, 183, 184

[56] References Cited

U.S. PATENT DOCUMENTS

| | | | |
|---|---|---|---|
| 1,091,073 | 3/1914 | Meek | 105/422 |
| 1,991,358 | 2/1935 | Bessy | 156/15 |
| 2,189,567 | 2/1940 | Miller | 156/15 |
| 2,287,667 | 6/1942 | Brown | 156/15 |
| 2,559,443 | 7/1951 | Kuhler | 105/422 |
| 2,833,001 | 5/1958 | Montefalco | 105/422 |
| 3,001,577 | 9/1961 | Anderson | 160/29 |
| 3,088,559 | 5/1963 | Farnsworth et al. | 189/36 |
| 3,181,481 | 5/1965 | Taylor | 105/377 |
| 3,250,742 | 5/1966 | Dit Michel Nalpas | 206/46 |
| 3,713,400 | 1/1973 | Teoli | 105/406 |
| 3,895,468 | 7/1975 | Bernstein | 52/222 |
| 4,212,252 | 7/1980 | Hart et al. | 105/406 |
| 4,331,083 | 5/1992 | Landregan et al. | 105/406 |
| 4,361,097 | 11/1982 | Jones et al. | 105/406 |
| 4,408,542 | 10/1983 | Heap | 105/406 |
| 4,574,986 | 3/1986 | Baris et al. | 222/94 |
| 4,726,411 | 2/1988 | Conley | 160/392 |
| 4,884,511 | 12/1989 | Hallam et al. | 105/247 |
| 4,893,568 | 1/1990 | Adams | 105/416 |
| 5,184,843 | 2/1993 | Berger et al. | 280/728 |
| 5,203,055 | 4/1993 | Broadwater, Sr. | 24/462 |

FOREIGN PATENT DOCUMENTS

| | | | |
|---|---|---|---|
| 0518165 | 12/1992 | European Pat. Off. | 296/182 |
| 1098850 | 6/1984 | U.S.S.R. | 105/422 |

OTHER PUBLICATIONS

Jones, R. M., Mechanics of Composite Materials, 1975, pp. 8, 9.

Primary Examiner—Mark T. Le
Attorney, Agent, or Firm—Chernoff, Vilhauer, McClung & Stenzel

[57] ABSTRACT

A gondola railway car with a structural frame of metal has panels of lightweight composite tension-bearing sheet material attached to the frame by clamps which grip the margins of the panels. The panels thus are structural components of the car body, while also acting to contain bulk cargo such as coal. The panels may be of aramid fiber cloth coated with a wear-resistant polymeric material, and particles of hard material may be embedded in the polymeric material to enhance resistance to mechanical erosion.

18 Claims, 9 Drawing Sheets

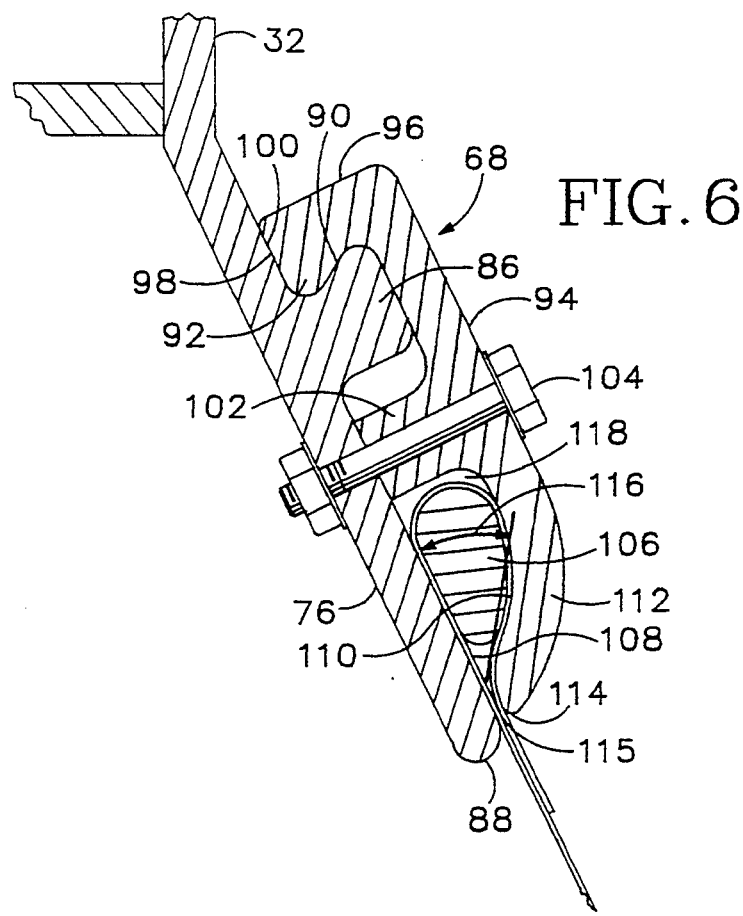
FIG. 6
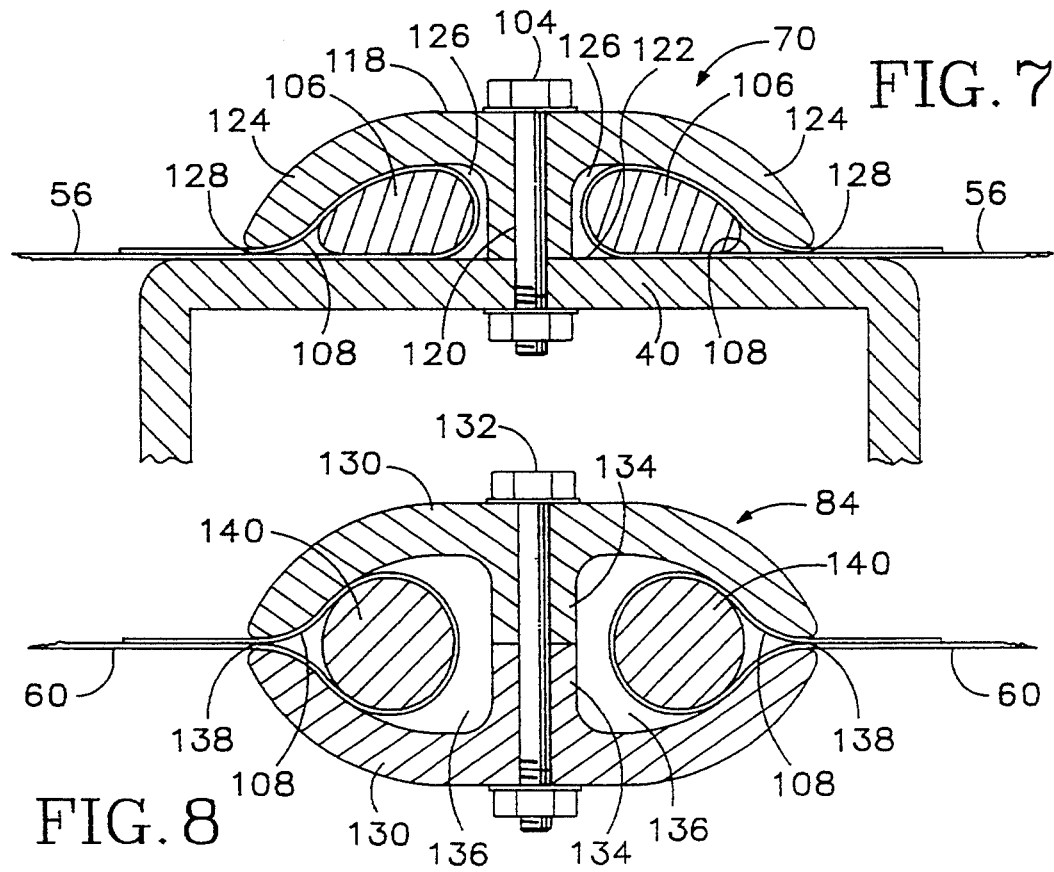
FIG. 7
FIG. 8

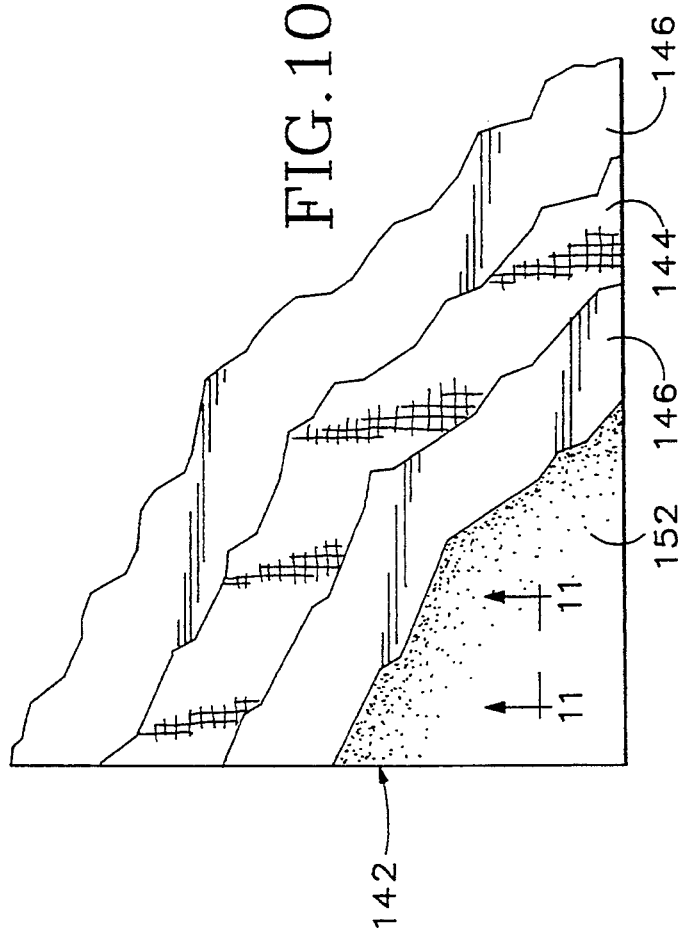
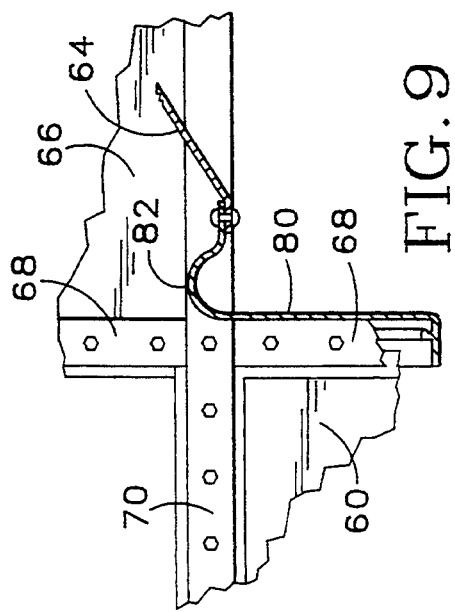
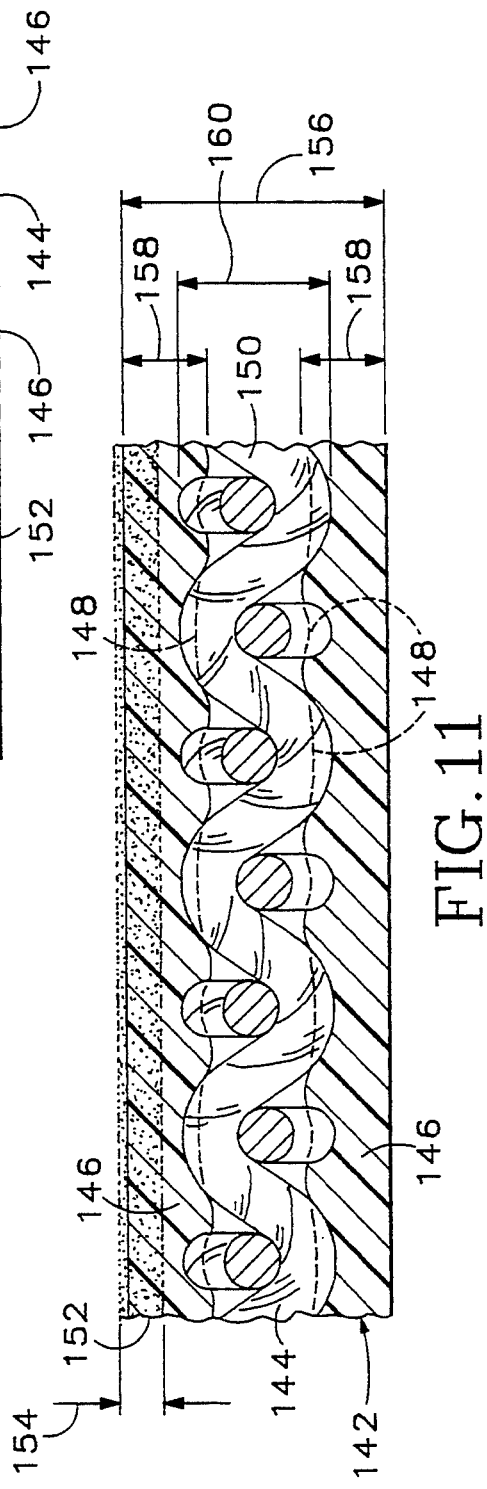

RAILWAY GONDOLA CAR INCORPORATING FLEXIBLE PANELS OF COMPOSITE SHEET MATERIAL

This invention was made with government support under United States of Bureau of Mines Research Contract No. CO209005, Project #9008042-3. The government has certain rights in the invention.

BACKGROUND OF THE INVENTION

The present invention relates to railway cars and more particularly to a railway car of the open gondola type in which cargo is loaded and unloaded through the open top of the car.

Gondola railway cars are normally employed to carry bulk cargos of granular or lump-form materials such as coal, sand, and gravel. Conventional gondola cars are of metal construction and have a continuous center sill structure extending the length of the car, and a flat bottom carried atop the center sill. Many of such cars are of a standard size in order to be unloaded by a dumper which turns the entire car upside down.

Teoli U.S. Pat. No. 3,713,400 discloses a gondola railway car in which there is a parabolic shaped bottom between the trucks, but there is no full-length center sill.

Jones et al. U.S. Pat. No. 4,361,097 discloses a gondola railway car having a continuous full-length center sill and a pair of longitudinally arranged curvilinear troughs arranged one on each side of the center sill.

Landregan U.S. Pat. No. 4,331,083 discloses a gondola car in which a longitudinally central portion of the center sill is lower than the portions at the ends of the car.

Heap U.S. Pat. No. 4,408,542 discloses a gondola car with a full-length center sill and a longitudinal curvilinear trough extending the full width of the car and extending beneath the center sill structure in a longitudinally central portion of the car.

While the gondola railway car structures previously known, such as those disclosed by the patents mentioned above, have certain advantages over the previously known gondola cars, particularly regarding the height of the center of gravity, such cars are still heavier than is desired for most efficient use.

Particularly in gondola cars for use in carrying coal, aluminum has been used to replace certain portions of structures previously made of steel, because of the ability of aluminum to withstand the corrosive effects of impurities, such as sulfur, commonly found in coal. Such aluminum structure can also reduce the weight of such cars, allowing a greater weight of cargo to be carried on each car, but aluminum construction is quite expensive, even considering the possibility of recovery of the aluminum from cars after their useful lifetime has ended. Therefore, it is still desired to provide a gondola railway car of adequate strength, but which is yet lighter than steel, less costly to construct and maintain, and more durable than previously available railway cars for carrying such types of cargo.

SUMMARY OF THE INVENTION

The present invention provides an answer to the previously stated need for an improved railway car for carrying bulk cargoes of granular or lump-form products such as coal, that is of adequate strength, resistant to corrosion, light in weight, and yet is reasonable in cost for production and repair.

According to the present invention a railway car is provided in which a structural frame includes lower side sills and other rigid structural members of metal, to which are attached tension-bearing panels constructed of strong tension-bearing material to define a cargo-carrying container having a bottom portion including such panels arranged to define at least one curvilinear trough portion.

In a preferred embodiment of the invention the tension-bearing panels of the railway car of the invention are of a flexible composite material including a textile-based fabric coated with an elastic protective material.

In one embodiment of the invention the tension-bearing panels include, on at least one side, a quantity of a wear-resistant particulate material embedded in the elastic protective material, in order to protect the textile fabric layer of the flexible composite material against wear.

In preferred embodiments of the invention the tension-bearing panels of flexible material are attached to the structural frame of the railway car by the use of clamp assemblies.

In one embodiment of the invention each tension-bearing panel has a tubular margin of the flexible material containing a locking bar engaged by a clamp assembly attached to a portion of the structural frame of the car body.

In one embodiment of the invention the cargo-carrying container portion of the car has upright side walls including panels of tension-bearing, flexible material whose margins are clamped to substantially rigid portions of the structural frame of the railway car.

In one embodiment of the invention upright arcuately curved transition panels help to define each end of the cargo-carrying container portion of the railway car.

It is therefore a principal object of the present invention to provide an improved body structure for a railway car for carrying bulk cargos of lump-form materials such as coal.

It is another object of the invention to provide a strong, wear-resistant, flexible, and reasonably inexpensive material suitable for use as tension-bearing panel portions of a cargo-carrying container portion of a vehicle such as a railway gondola car for carrying lump-form bulk cargo.

It is another object of the invention to provide a clamp assembly for attaching tension-bearing panels to rigid frame structure members and to one another, in which tension in the flexible tension-bearing material causes the clamp assembly to grip the material more tightly.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 6 is a view taken along line 6—6 of FIG. 2, at an enlarged scale, showing a clamp assembly holding a flexible panel attached to a portion of the structural frame of a railway car body according to the invention.

FIG. 7 is a sectional view, taken along line 7—7 of FIG. 1, showing a clamping assembly for joining together adjacent panels of flexible composite textile-based material in a railway car according to the present invention, while also attaching them to an element of a structural frame of the car body.

FIG. 8 is a view similar to that of FIG. 7, showing an alternative clamping assembly for joining together adjacent panels of flexible composite tension-bearing material.

FIG. 9 is a detail view showing the arrangement of a rigid end plate in a cargo trough portion of a railway car according to the invention.

FIG. 10 is a partially cut-away, face view of a part of a sheet of a composite textile-based material suitable for use as a flexible panel of a railway car according to the invention.

FIG. 11 is a sectional view of the composite textile-based material shown in FIG. 10, taken along line 11—11, at an enlarged scale.

DETAILED DESCRIPTION OF THE INVENTION

Figure 1:
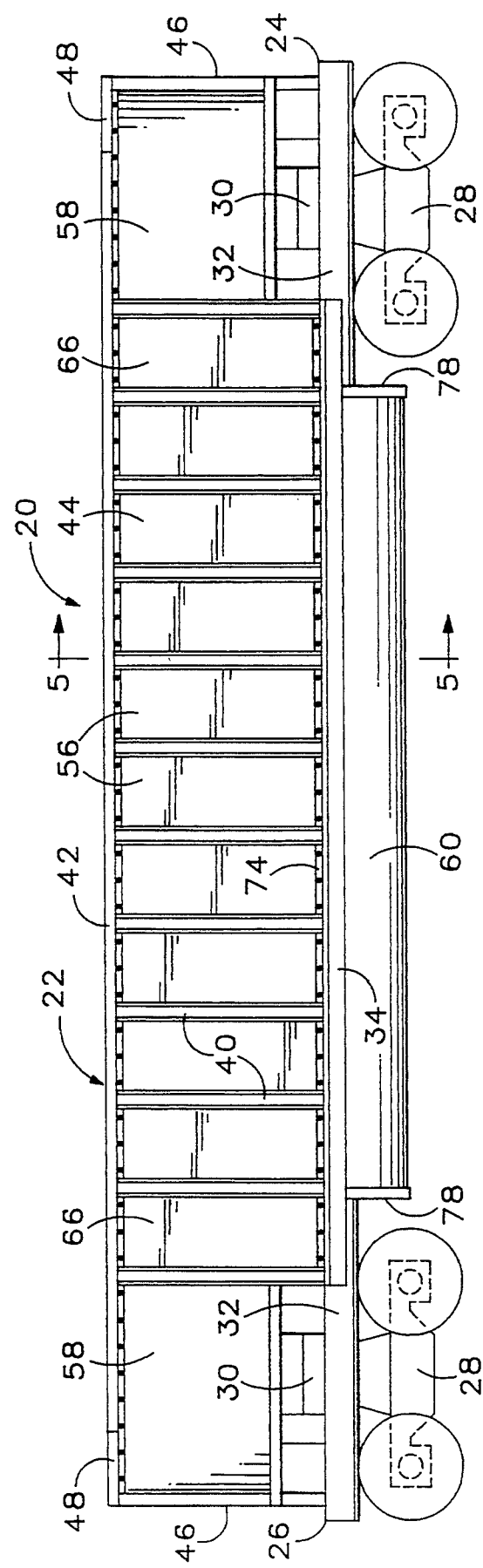
FIG. 1 is a side elevational view of a railway car embodying the present invention.
Figure 2:
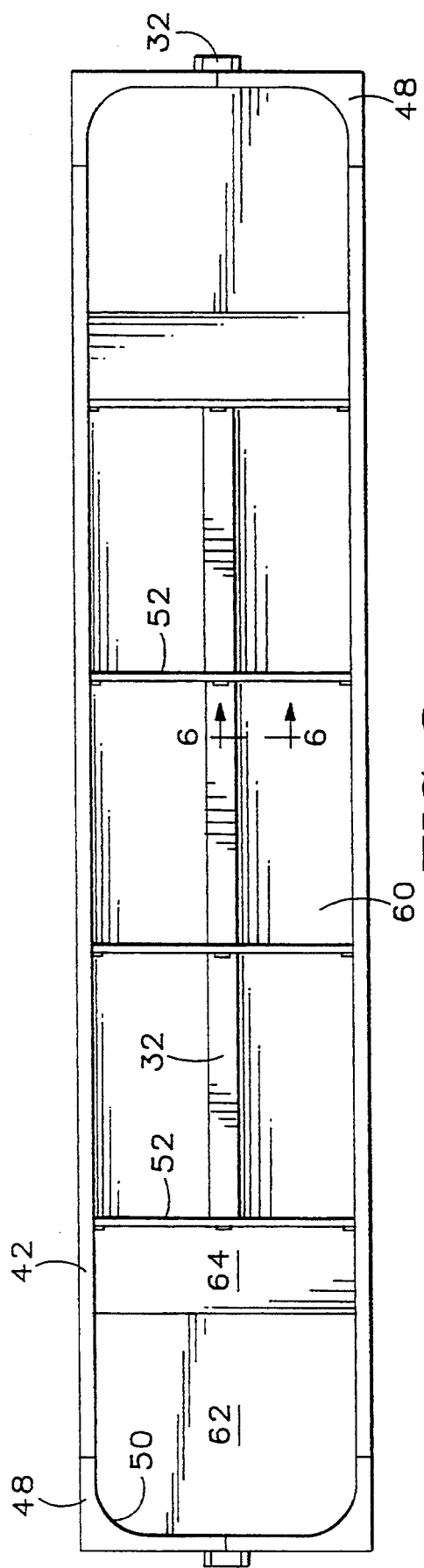
FIG. 2 is a top plan view of the railway car shown in FIG. 1.
Figure 3:
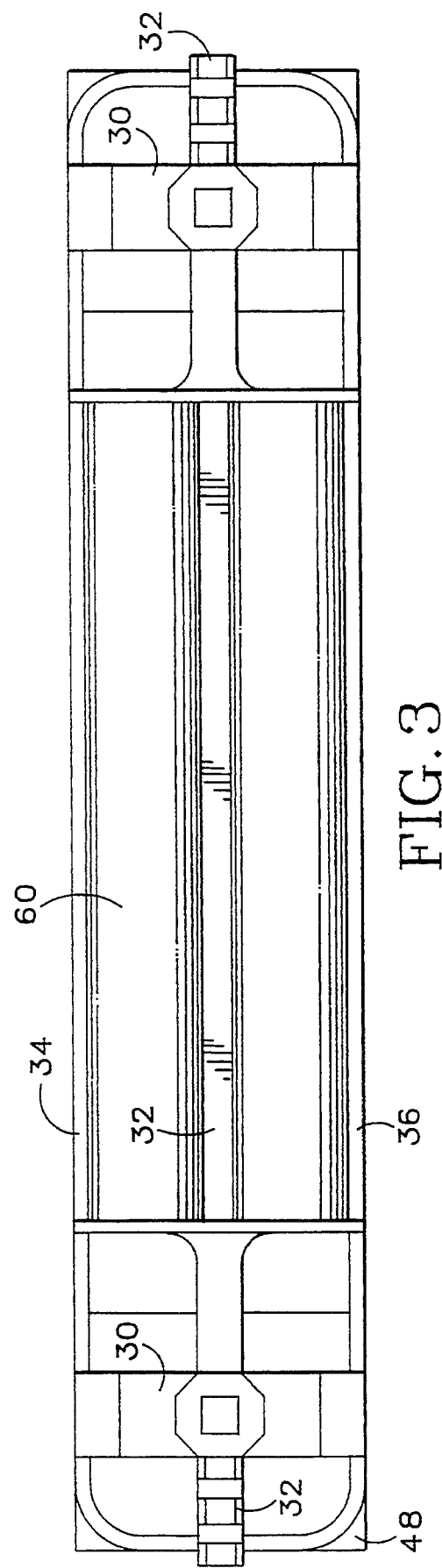
FIG. 3 is a bottom plan view of the body of the railway car shown in FIG. 1.
Figure 4:
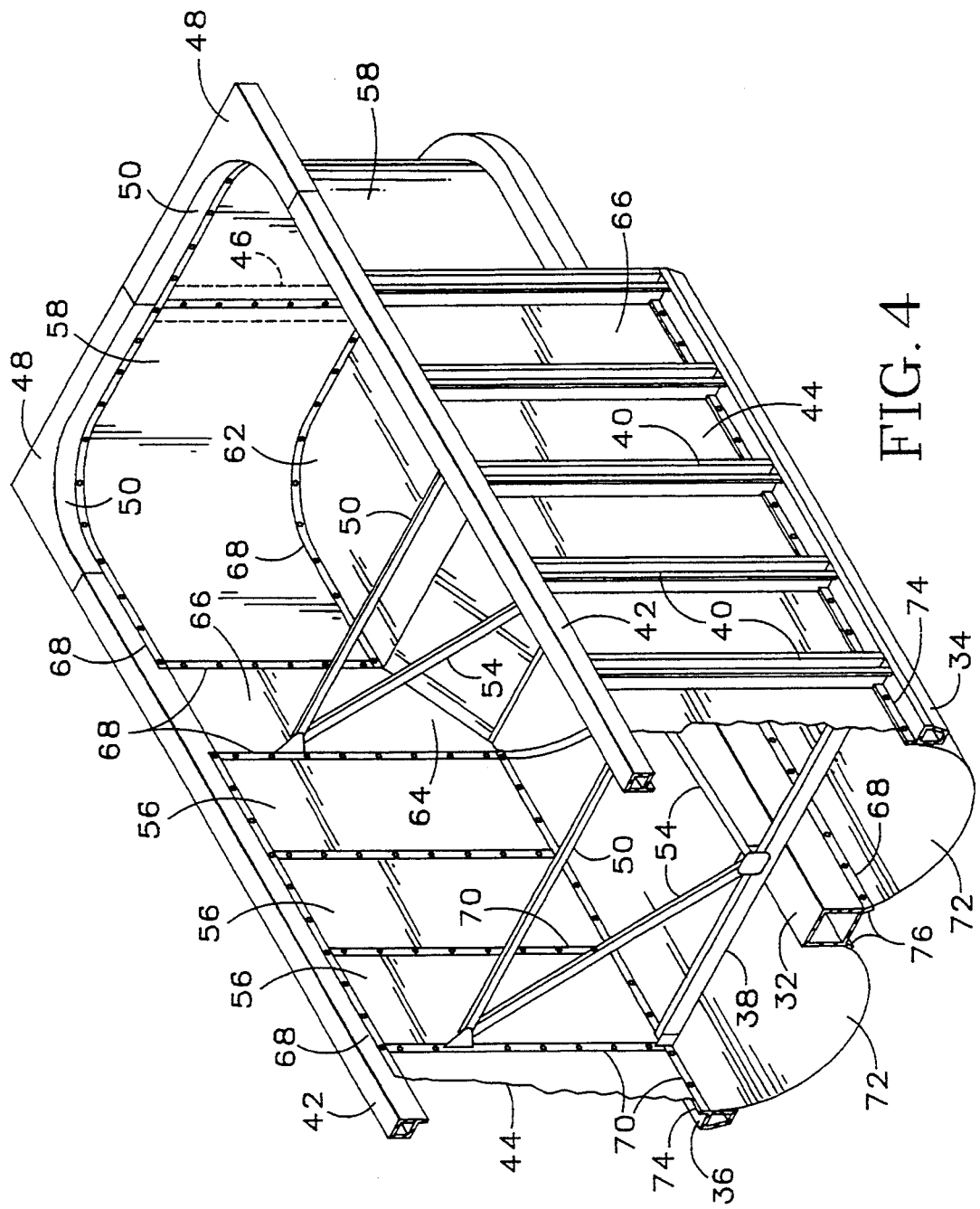
FIG. 4 is an isometric view showing one half of the car shown in FIG. 1.
Figure 5:
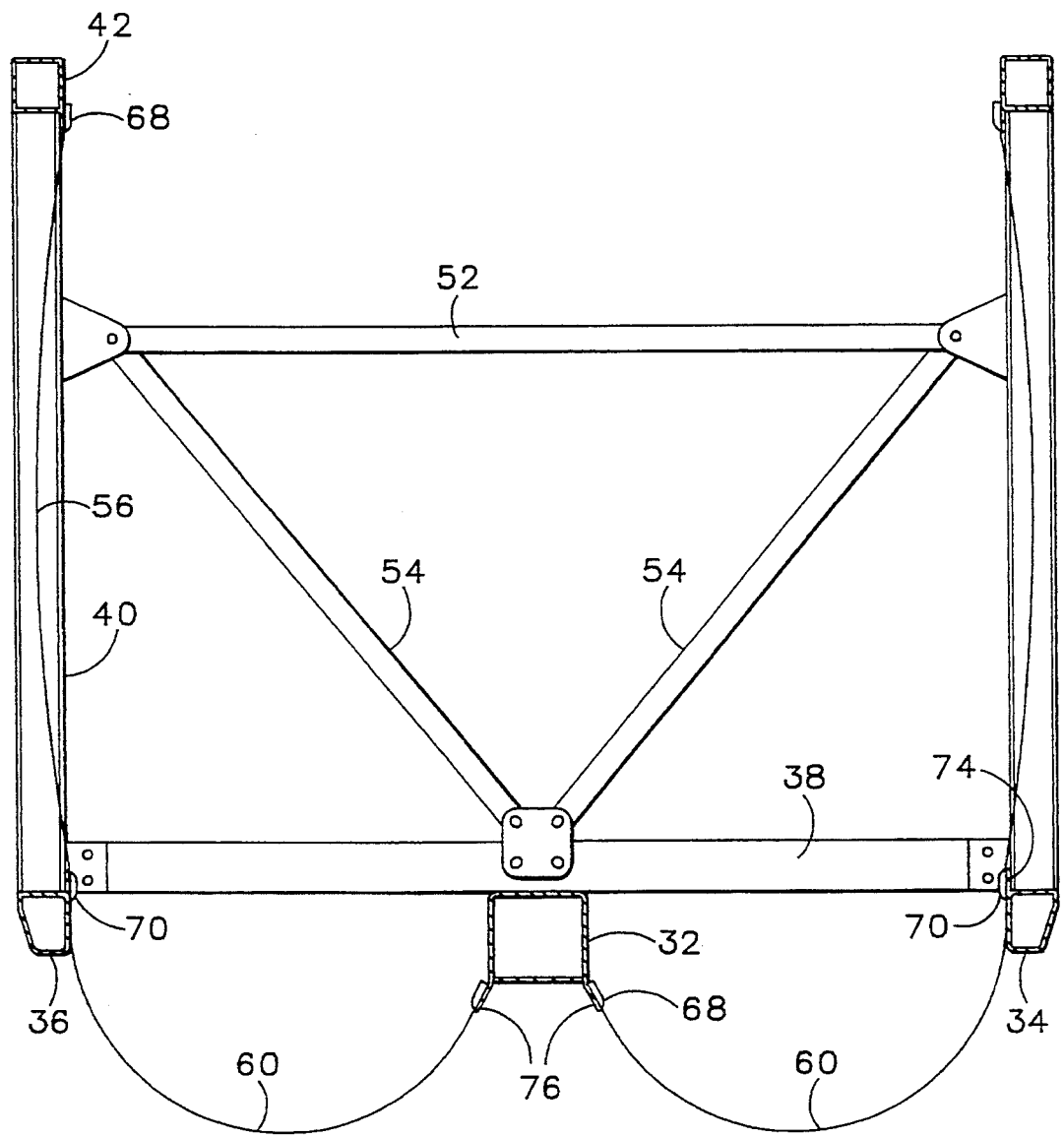
FIG. 5 is a section view of the car shown in FIG. 1, taken along line 5—5.
Figure 12:
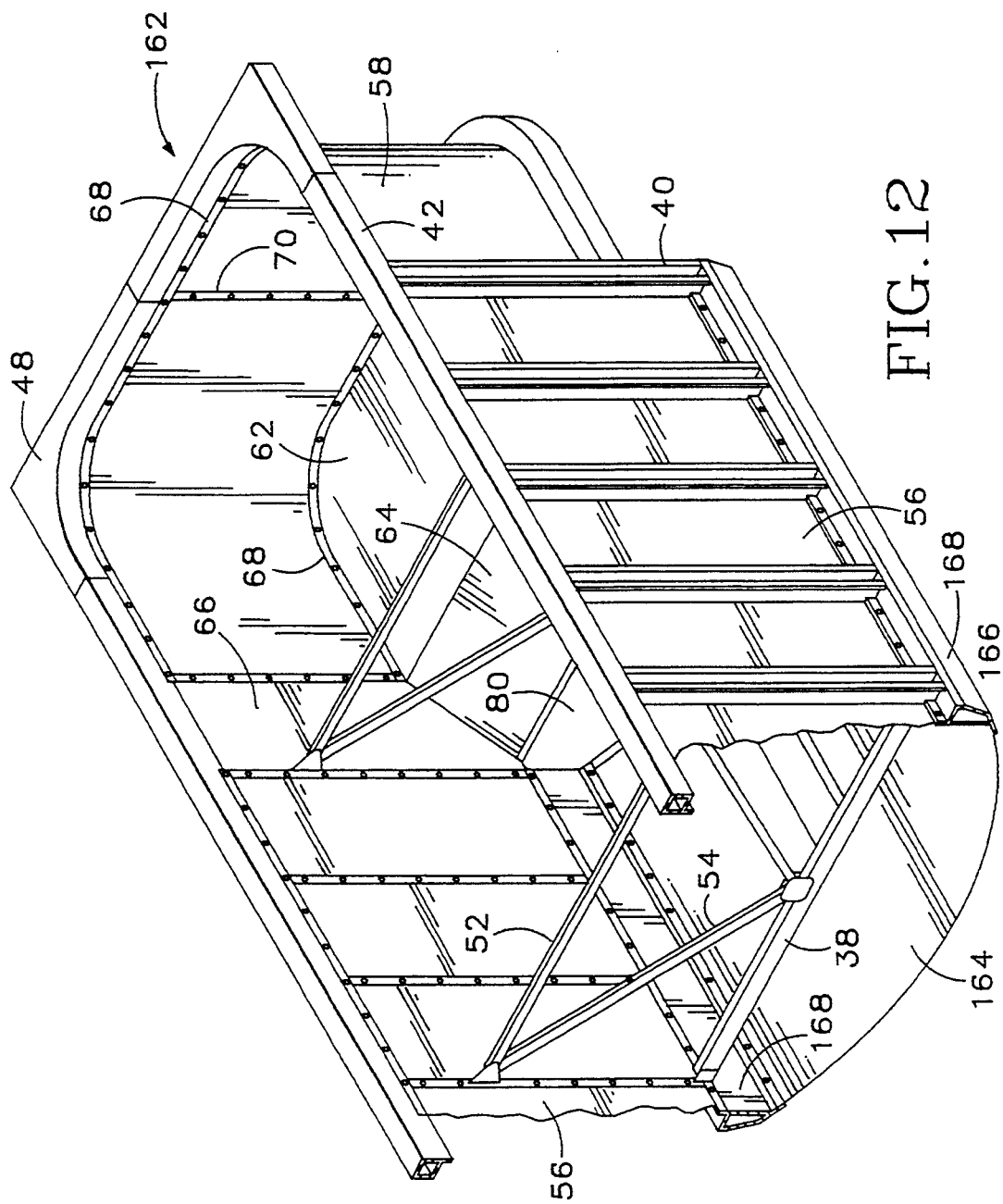
FIG. 12 is an isometric view similar to that of FIG. 4, showing a car having a bottom including a single bottom trough of suspended tension-bearing material extending over the full width of the car.
Figure 13:
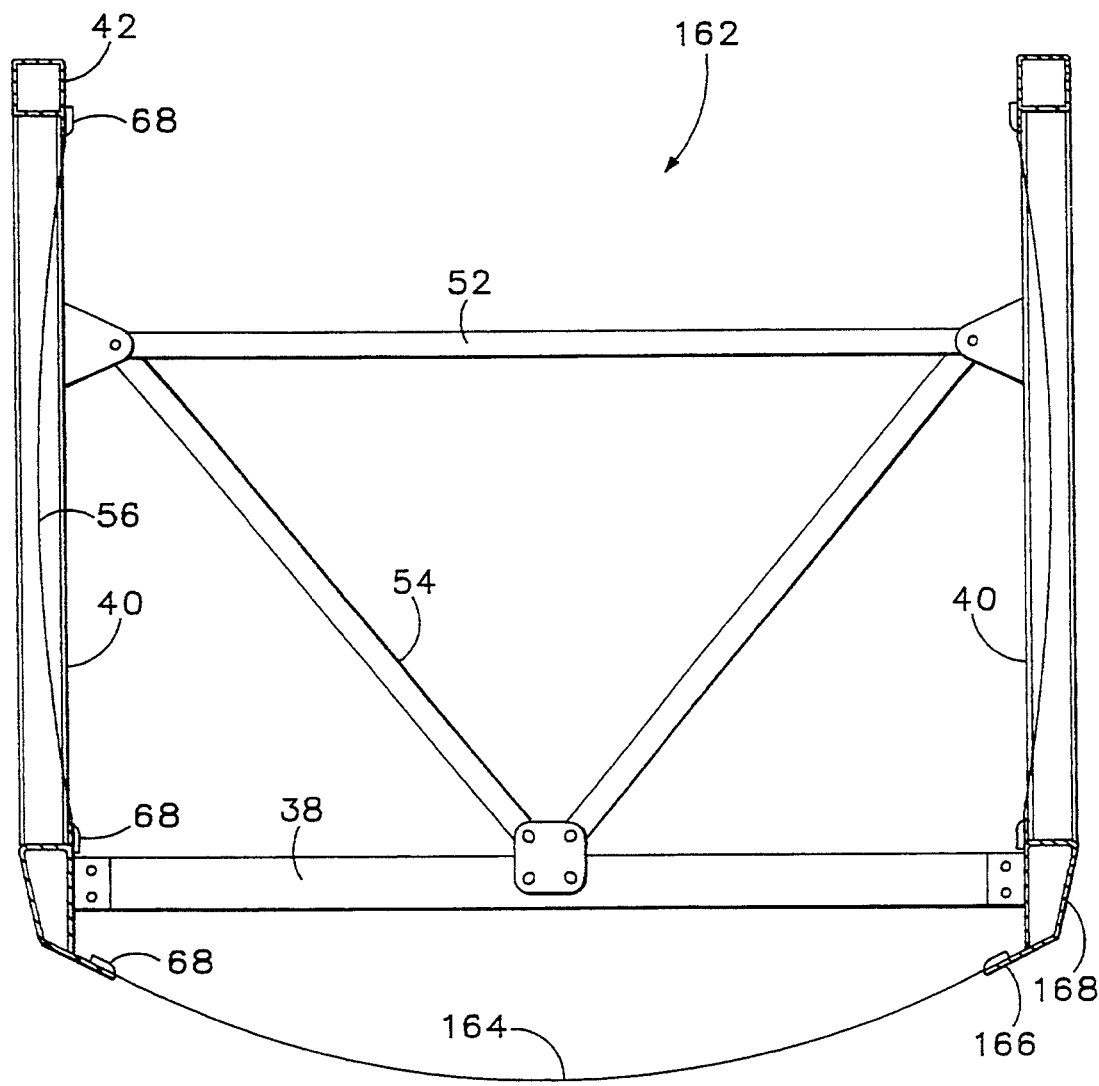
FIG. 13 is a section view taken along line 13—13 of FIG. 12.
Figure 15:
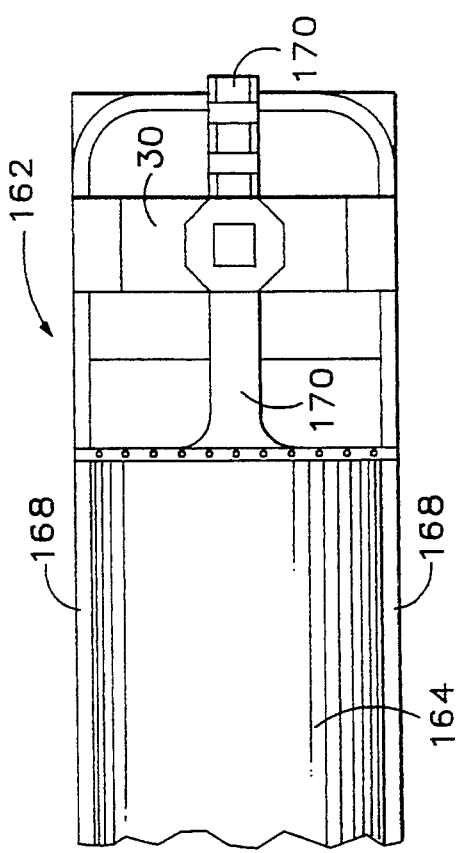
FIG. 15 is a bottom plan view of one-half of the body for a railway car shown in FIG. 12.
Figure 14:
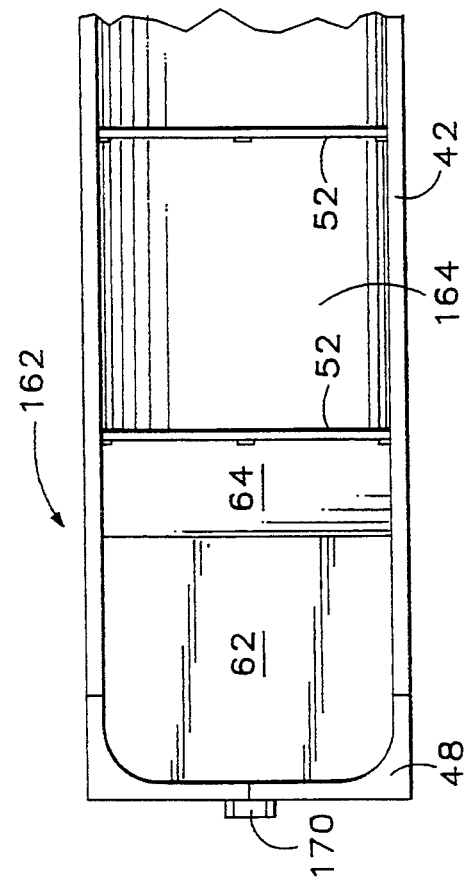
FIG. 14 is a top plan view of one-half of the body for a railway car shown in FIG. 12.

Referring first to FIGS. 1–9 of the drawings which form a part of the disclosure of the invention, a rail car 20 which is a preferred embodiment of the invention includes a body 22 having opposite ends 24 and 26 each supported on a wheeled truck 28. A body bolster 30 is located near each end 24, 26 of the body 22 and a center sill 32 extends longitudinally of the car over its entire length.

A lower side sill 34, 36 is located on each side of the car 20, extending longitudinally parallel with the center sill over the distance between the body bolsters 30. Cross bearers 38 extend laterally above the center sill 32 between the lower side sills 34, 36.

Side wall upright members 40, preferably of "hat" section metal, are attached to the cross bearers 38 and the lower side sills 34, 36 and are interconnected by side wall top chords 42 to define the location of an upstanding side wall 44 on each side of the car. An upright end post 46 extends above the center sill 32 at each end 24, 26 of the car, and a horizontal top chord end member 48 with an arcuate inner margin 50 extends to each end post 46 from the nearest side wall upright member 40, on each side of the car 20.

Horizontal transverse braces 52, which are preferably made of tubular aluminum, interconnect and provide mutual support between the upper portions of laterally opposite ones of the side wall upright members 40. Diagonal cross braces 54 of similar construction extend diagonally upward from the centers of the cross bearers 38 to connecting plates attached to the side wall upright members 40, to provide a stiff structural frame for the car. While the center sill 32 and body bolsters 30 are assembled by welding together structural elements made of rolled steel or bent steel plate, the lower side sills 34, 36, side wall upright members 40 and side wall top chords 42 are preferably of aluminum to reduce weight and resist corrosive effects of coal.

The enclosure of a cargo-carrying container portion of the car is defined primarily by side wall panels 56, connecting end transition panels 58, and bottom panels 60 of strong, wear-resistant tension-bearing, flexible, composite sheet material whose margins are securely clamped to respective elements of the structural frame of the car. A horizontal floor end portion 62 and a sloping floor portion 64 of the bottom of the cargo-carrying container portion, adjacent and above the body bolster 30 at each end of the car, are preferably constructed of aluminum plate material, as are a pair of laterally opposite sidewall panels 66 at each end of the car.

The side wall panels 56, of composite sheet material, the end transition panels 58, and the bottom panels 60 are all generally rectangular and are attached to the respective elements of the structural frame of the car by elongate clamp assemblies 68 or 70, which will be described presently in greater detail. Because of this attachment the panels 56, 58, 60 serve not only to contain cargo but also to carry tensile stress loads as part of the structure of the car body 22.

The bottom panels 60 are curved about a longitudinally-extending axis of curvature, forming curvilinear troughs 72 extending lower than the bottom of the center sill. The longitudinal margins of each panel are attached to the respective side wall 44 by clamp assemblies 70 mounted on a flange 74 extending upward from and along the inner side of the top of the lower side sill 34 or 36, and are connected by clamp assemblies 68 to respective diagonally downwardly- and outwardly-directed bottom flanges 76 of the center sill 32.

An arcuate transverse support strip 78 extends downward beneath the sloping floor portion 64 adjacent the body bolster 30. As shown in FIG. 9, the transverse support strip 78 is attached to an aluminum end plate 80 attached, through a flexible curved margin portion 82, to the sloping floor portion 64, to complete closure of the bottom of the cargo-carrying container portion of the car body 22.

Longitudinally adjacent ones of the bottom panels 60, in a car where such bottom panels do not extend the full length of the car body 22, are connected with each other to transfer tension longitudinally of the car by clamp assemblies 84, shown in FIG. 8, which carry tension-loading longitudinally of the car between adjacent ones of the bottom panels.

Referring to FIG. 6, the clamp assembly 68 is seen to include a tension-carrying elongate projection in the form of a clamp-retaining rail 86 extending parallel with, but spaced a small distance apart from, the rounded margin 88 of the respective structural frame member, such as the diagonally downwardly-extending flange 76 of the center sill 32. The clamp-retaining rail 86 may be welded to the structural frame member or be an integrally made part of it. The clamp-retaining rail 86 has an inclined contact face 90 to receive a hook portion 92 of a clamp bar 94. The clamp bar 94, which may preferably be of extruded aluminum, includes a heel portion 96 defining the hook 92 whose shape mates with the inclined face 90 of the clamp-retaining rail 86. The heel 96 also has a mating surface 98 which rests snugly against a mating surface 100 of the flange 76. A central rib 102 of the clamp bar 94 extends toward the flange 76 and defines holes spaced apart from one another along the length of the clamping bar 94 to receive fasteners such as bolts 104 to fasten the clamping bar 94 to the flange 76 in a position established cooperatively by the central rib 102 and the heel 96.

A locking bar 106 is located within a tubular margin portion 108 of a flexible bottom panel 60 fastened to the center sill 32 by the clamping assembly 68 shown in FIG. 6. The locking bar 106 preferably has a shape providing surfaces whose shapes correspond with those of the adjacent surface of the respective structural frame member of the portion of the car to which the panel is attached by the clamping assembly 68 at any particular location, and of the inner surface 110 of the outer or toe portion 112 of the clamp bar. A toe margin portion 114 of the clamp bar 94 is spaced a small distance apart from the opposite surface of the flange 76 or other structural element of the structural frame of the car 20, forming an elongate slot 115 through which the panel is free to move to pull the locking bar 110 into a position within the cavity 118 between the toe portion 112 of the clamp bar 94 and the structural frame member of the car body 22 providing a large area of surface contact on each side of the locking bar 106, and thus compressing a correspondingly large portion of the tubular margin 108 of the bottom panel 60 or other panel, depending on the location of the particular clamp assembly 68, between the locking bar 94 and the adjacent surface of the flange 76, and between the arcuate surface of the locking bar 106 and the arcuate inner surface 110 of the toe portion of the clamp bar.

The surfaces of the locking bar 106, the flange of the structural element of the car, and the arcuate concave inner surface 110 of the clamp bar 94 are all generally smooth, rather than being knurled, grooved or toothed, in order to avoid cutting or puncturing and thus weakening the structure of the composite sheet material forming the tubular margin portion 108 of the panel. The angle 116 defined between the surface of the flange and the outer surface of the locking bar, however, is designed to be wide enough to avoid having the locking bar wedge between the toe portion 112 of the clamp bar 94 and the flange of the structural element of the car. As a desired result, when tension in the tubular margin 108 is relaxed, as when the car is unloaded or while the structural frame of the car is flexing as the car is traveling along a railway track in a loaded condition, it is possible for portions of the tubular margin 108 of the panels to move slightly and thus adjust their positions with respect to the respective clamp assemblies 68 to achieve more equal distribution of tension loads through the panels.

The clamp assemblies 70, shown in section view in FIG. 7, include a clamp bar 118 having a central rib 120 defining holes to receive fasteners such as bolts 104 to connect the clamp bar 118 to a structural frame member of the car 20, such as the flange 74 atop the lower side sill 34 or 36, or the central face 122 of the side wall upright members 40. A respective toe portion 124 extends away from the central rib 120 in each direction to define a respective elongate cavity 126 and slot 128 to receive the tubular margin 108 and a respective locking bar 106 for a panel 56, 58 or 60 of composite sheet material on each side of the clamp assembly 70.

The clamp assembly 84 shown in FIG. 8 may be used to connect parallel tubular margins 108 of panels of composite sheet material, such as bottom panels 69, where there is no adjacent structural frame element of the car body 22, as where the structural panel 60 of composite sheet material cannot easily be made in a large enough size. The clamp assembly 84 includes a pair of similar clamp bars 130 each resembling the clamp bar 118 of the clamp assembly 70 described above. The pair of clamp bars 130 are held together by fasteners such as bolts 132 spaced apart along the rib 134, and thus define elongate cavities 136 and slots 138 to receive the tubular margins 108 of adjacent composite panels, with locking bars 140 held within the tubular margins 108.

Each of the tension-bearing panels 56 of the side walls 44, the end transition panels 58, and the bottom panels 60 is preferably of a similar composite material 142, shown in FIGS. 10 and 11, which is primarily a textile-based fabric layer 144, covered with a protective coating to protect the textile fibers which provide the bulk of the tensile strength of each panel from mechanical abrasion, from harmful chemical reactions, and from potentially damaging radiation. A preferred material for the flexible fabric layer 144 of the composite material for tension-bearing for the car as described above is a plain weave cloth, woven of yarns of twisted fibers of an aramid polymeric material. The aramid polymeric material available as textile fibers from E. I. Dupont de Nemours and Company of Wilmington, Del. under the trademark Kevlar 29 is preferred, since it has adequate tensile strength, for example about 400,000 psi, and a stiffness modulus of about 9,000,000 psi, yet is only about one-fifth as dense as steel, whose tensile strength is less than that of the Kevlar 29 aramid material. The Kevlar 29 material is thus capable of carrying the same tensile stress, using composite panels of significantly lighter weight than that of equivalent panels of steel construction, yet at a lower cost.

Such cloth of Kevlar 29 textile obtained from High-Pro Form Fabrics, Inc. of Newark, Del., is of plain weave of twisted Kevlar fibers, and has a tensile strength of about 1800 pounds per lineal inch of the fabric, which is woven of yarns twisted of many continuous, round, cross-section filaments each having a denier of about 1.5 and a diameter of slightly less than 0.5 mil. The surface of the cloth is scuffed to provide desired absorption and adhesion of the coating materials applied to form the composite material for the tension-bearing panels.

In preparing the composite material for use as the panels according to the present invention a coating 146 of a wear-resistant polymeric plastic material such as a room temperature curing polyurethane material is prepared and spread on each of the opposite surfaces of the aramid fiber cloth in a liquid form, and then is allowed to cure. The polymeric material adheres to the surface of the aramid cloth, extending a portion of the way into the yarns and among the fibers of the cloth, as shown at 148 forming a partially impregnated layer of the aramid cloth covered by a layer of the polyurethane or other polymeric material on each side of the central layer 144 of aramid cloth. The central portion 150 of the cloth, however, may remain unimpregnated and thus free to flexibly carry tensile loads.

On at least one side of the composite textile-based sheet material thus formed, while the polymeric coating is still only partially cured, an outer layer 152 of the polymeric protective material is impregnated to a small depth 154 with closely spaced particles of a hard wear-resistant material such as alumina or silicon carbide, small enough to become fully embedded and surrounded in a matrix of the polyurethane or other polymeric material of the coating layer 146. This provides additional surface hardness and resistance to mechanical erosion of the surface of the composite material of the flexible panels, particularly on the side of each panel which will be in contact with cargo carried within the car, yet the composite sheet material remains flexible enough to serve as the panels 56, 58 or 60 of the car body 22. The resulting composite sheet material 142 has a total thickness 156 of about 70–100 mils, of which the coating layer 146 on each side, of polymeric material, extending somewhat into the aramid cloth 144, has a thickness 158 of about 20–40 mils. The particles of hard wear-resistant material are embedded to a depth 154 of preferably about 10–20 mils, so as to be spaced somewhat apart from the textile cloth of the composite sheet, which normally has a thickness 160 of about 30 mils.

An acceptable polyurethane material for use as the coating for the aramid cloth is a two-part polyurethane casting elastomer, available from the Hexcel Corporation of Chatsworth, Cal. under the trade name Uralite 3177. When cured, the material has a tensile strength of about 5,000 psi, permits elongation of about 6%, and has a Shore D hardness at 75° F. of 72. Other materials, such as epoxy resins and polyamide resins which can also be applied by coating the Kevlar fabric are also useable. For example, a bisphenol A/epichlorhydrin based epoxy resin available from the Shell Chemical Company as EPON ® Resin 828, Product code 43240, would be usable. The previously-mentioned polyurethane coating material is believed to be preferable, however, because of its greater ability to resist mechanical abrasion, its somewhat lower coefficient of friction, its capacity for elastic elongation greater than that of the aramid fiber, which preserves flexibility without delamination and cracking of panels of composite structure including such polyurethane coatings, and because it causes only negligible decrease in strength of the aramid cloth when used as a coating.

While such panels of composite structure are flexible, once the aramid fiber cloth layer 144 is coated with such a polymeric material it is much less flexible than when uncoated, and, as a result, the tubular margin portions 108 of each panel 56, 58 and 60 are preferably left uncoated by the polymer coating material until the Kevlar fabric has been shaped appropriately to fit around the locking bar of the appropriate clamping assembly. The tubular margins may be formed by sewing the aramid cloth, and the polymeric coating material is also used as an adhesive to help retain the margin in a tubular configuration.

Because of the directional characteristics of the aramid cloth it is desirable to have the yarns oriented diagonally in the side wall panels 56, while the yarns are preferably parallel with and normal to the margins of the bottom panels 60 and end transition panels 58.

In a car body 162 which is an alternative embodiment of the invention, shown in FIGS. 12–15, a single curvilinear trough is provided, the trough being defined by a bottom panel 164 of tension-bearing composite material, spanning the entire width of the car body and having a horizontal axis of curvature extending longitudinally of the car body. The opposite longitudinal margins of the bottom panels are connected, respectively, by clamp assemblies 68, to diagonally inwardly- and downwardly-extending flanges 166 of parallel lower side sills 168, which are preferably of steel, and the stub center sill 170 at each end of the car body does not extend beyond the sloping floor portion 64. In such a car body 162 the horizontal floor 62 and sloping floor portion 64 are preferably of steel and provide load bearing interconnection between the lower side sills 168, the stub center sill 170 and the body bolster 30 at each end of the car body. The structure of the car body 162 above the lower side sills is similar to that of the car body 22, except that there may be greater use of steel in structural frame elements.

Figure 16:
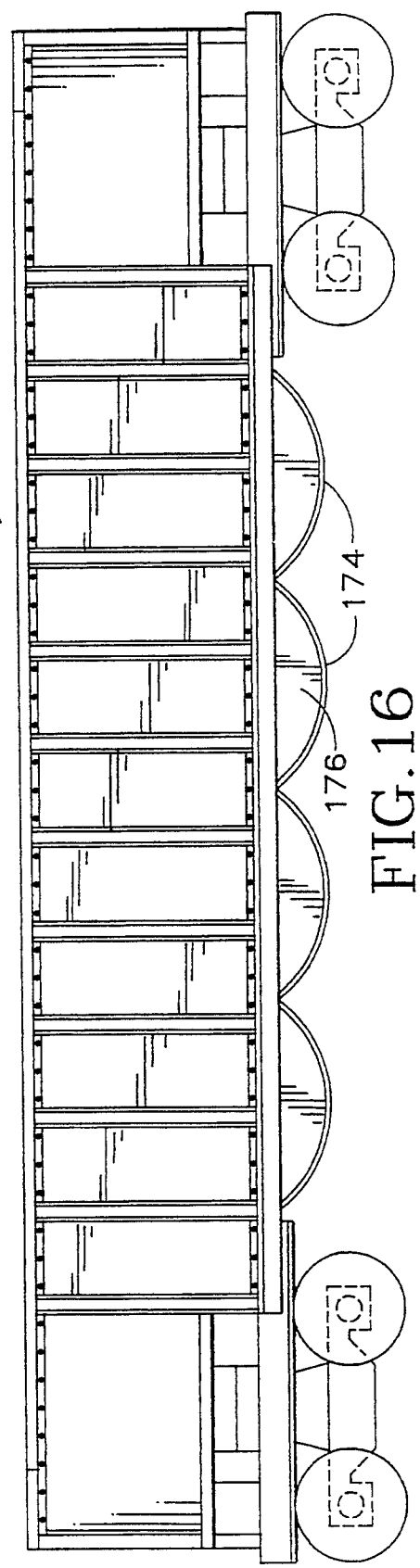
FIG. 16 is a side elevational view of a railway car according to the present invention, including a plurality of transversely oriented curvilinear troughs defined by panels of flexible composite textile-based material.

In a car body 172 which is a further alternative embodiment of the invention, shown schematically in FIG. 16, bottom panels of composite flexible sheet material of the type disclosed above are attached to connecting strips 174 which extend arcuately beneath the lower side sills on both sides of the car, to define curvilinear troughs 176 extending transversely, that is, with horizontal axes of curvature extending transversely of the car body, with transverse margin portions of the bottom panels attached to transverse flanges extending diagonally downward from cross bearers.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A body for a railway car for carrying granular or lump-type bulk cargo, comprising:
   (a) a pair of longitudinal lower side sills;
   (b) an upstanding side wall extending above each said lower side sill; and
   (c) a tension-bearing, cargo-supporting bottom panel of a textile-based sheet material having a longitudinally-extending margin attached to one of said lower side sills.

2. The body for a railway car of claim 1 wherein said sheet material includes a main load-bearing layer of a woven cloth of synthetic fiber.

3. The body for a railway car of claim 1, including a clamp assembly associated with one of said lower side sills and wherein said longitudinally-extending margin of said bottom panel is attached to said one of said side sills by said clamp assembly.

4. A body for a railway car for carrying granular or lump-type bulk cargo, comprising:
   (a) a structural frame having a pair of opposite ends;
   (b) means including respective portions of said structural frame, for defining a cargo container, said cargo container including:
      (i) a pair of opposite upstanding longitudinally-extending side walls;
      (ii) a pair of opposite upstanding transversely-extending end walls; and
      (iii) a tension-bearing bottom panel of a textile-based sheet material defining a bottom of said cargo container, said bottom panel including a longitudinal margin portion interconnected with one of said side walls.

5. The body for a railway car of claim 4 wherein said textile-based sheet material includes a textile fabric covered by a protective coating of material which is capable of greater elastic elongation than said textile fabric.

6. The body for a railway car of claim 4 wherein said textile-based sheet material includes a textile fabric covered by a protective coating of a polymeric plastic material and wherein a quantity of a particulate ceramic material is embedded in said polymeric plastic material, with said particulate ceramic material supported spaced apart from said textile fabric by a portion of said coating of polymeric plastic material.

7. The body for a railway car of claim 4 wherein said bottom panel extends from one to the other of said side walls and defines a longitudinal curvilinear trough having an axis of curvature extending longitudinally of said car.

8. The body for a railway car of claim 4, each said end wall including an upstanding structural frame member, said body further including a connecting panel of said flexible textile-based material extending as an arcuate, tension-bearing transition portion of said cargo-carrying container between one of said side walls and an adjacent one of said end walls of said car body.

9. The railway car of claim 8 wherein said arcuate connecting panel has respective margin portions attached to said side wall and to said upstanding structural frame member of said adjacent end wall by respective clamp assemblies.

10. The body for a railway car of claim 4 wherein a major portion of each said side wall consists primarily of at least one tension-bearing panel of textile-based sheet material attached to a plurality of respective side wall frame members of said structural frame.

11. A body for a railway car for carrying granular or lump-type bulk cargo, comprising:
(a) a pair of longitudinal lower side sills;
(b) an upstanding side wall extending above each said lower side sill; and
(c) a plurality of tension-bearing cargo-supporting bottom panels, of a textile-based sheet material, each of said bottom panels defining one of a plurality of curvilinear troughs, each said trough having an axis of curvature extending transversely of said body and having an arcuately curved longitudinal margin thereof supported by one of said lower side sills.

12. A body for a railway car for carrying granular or lump-type bulk cargo, comprising:
(a) a pair of longitudinal lower side sills;
(b) an upstanding side wall extending above each said lower side sill;
(c) a clamp assembly associated with one of said lower side sills; and
(d) a tension-bearing, cargo-supporting bottom panel of a textile-based sheet material having a longitudinally-extending margin attached to said one of said lower side sills by said clamp assembly, said bottom panel including a tubular margin and a locking bar located within said tubular margin, and said clamp assembly including a clamp bar adjustably attached to and extending along said one of said lower side sills, said clamp bar and a portion of said one of said lower side sills cooperatively defining an elongate slot and an elongate cavity, said locking bar and said tubular margin being located within said elongate cavity and said clamp bar retaining said locking bar and said tubular margin of said bottom panel between said clamp bar and said one of said lower side sills, with said bottom panel extending through said slot.

13. A body for a railway car for carrying granular or lump-type bulk cargo, comprising:
(a) a structural frame having a pair of opposite ends and a center sill interconnecting said opposite ends;
(b) means including respective portions of said structural frame, for defining a cargo container, said cargo container including:
(i) a pair of opposite upstanding longitudinally-extending side walls including a pair of lower side sills spaced laterally apart from said center sill and located respectively on opposite sides of said center sill;
(ii) a pair of opposite upstanding transversely-extending end walls; and
(iii) a bottom panel of a textile-based sheet material, said bottom panel including a longitudinal margin portion interconnected with one of said side walls, said longitudinal margin portion of said bottom panel being attached to a respective one of said side sills, and said bottom panel including another margin portion attached to said center sill.

14. The body for a railway car of claim 13, including a pair of said bottom panels wherein each said bottom panel defines a respective one of a pair of longitudinal curvilinear troughs each located between said center sill and a respective one of said lower side sills and wherein each said curvilinear trough has a longitudinal axis extending longitudinally of said car body.

15. A body for a railway car for carrying granular or lump-type bulk cargo, comprising:
(a) a structural frame including a plurality of structural frame members and having a pair of opposite ends;
(b) means including respective portions of said structural frame, for defining a cargo container, said cargo container including:
(i) a pair of opposite upstanding longitudinally-extending side walls;
(ii) a pair of opposite upstanding transversely-extending end walls; and
(iii) a plurality of tension-bearing panels of a textile-based sheet material, including a bottom panel having a longitudinal margin portion interconnected with one of said side walls, said body including a panel clamp assembly attaching one of said plurality of tension-bearing panels to a respective one of said structural frame members, said one of said tension-bearing panels including a tubular margin, and a locking bar being located within said tubular margin, said panel clamp assembly having a clamp-retaining rail fixedly attached to said one of said structural frame members and including a clamp bar having a hooked heel side and a toe end margin, said hooked heel side matingly engaging said clamp-retaining rail and said toe end margin cooperating with said one of said structural frame members to define an elongate slot and an elongate cavity, said locking bar and said tubular margin of said tension-bearing panel being held within said elongate cavity and said panel extending through said slot.

16. The body for a railway car of claim 15 wherein said locking bar is of tapered oval cross-sectional shape and said toe end margin portion of said clamp bar has a correspondingly shaped inner surface for clamping said tubular margin of said tension-bearing panel between said locking bar and said structural frame member and between said clamping bar and said locking bar.

17. A railway car body for carrying bulk materials, comprising:
   (a) a pair of side walls; and
   (b) a suspended tension-bearing floor of flexible textile-based material, each of said side walls having a bottom margin and said floor having a pair of opposite parallel side margins, each one of said side margins being attached to the bottom margin of a respective one of said side walls, suspending said floor between said side walls.

18. A railway car for carrying bulk cargo, comprising:
   (a) an elongate car body having opposite ends each supported on a respective wheeled truck;
   (b) a pair of opposing upstanding side walls extending longitudinally of said car body;
   (c) a pair of opposing upstanding end walls extending transversely of said car body; and
   (d) a tension-bearing connecting panel of flexible textile-based material having respective margin portions attached respectively to one of said upstanding side walls and to an adjacent one of said end walls.

* * * * *